United States Patent
Schibsbye

(10) Patent No.: US 11,267,208 B2
(45) Date of Patent: Mar. 8, 2022

(54) PRE-KITTED INFUSION PACKAGE INCLUDING VACUUM BAG WITH BUILT-IN INFUSION CHANNELS AND CONSUMABLES

(71) Applicant: TPI Composites, Inc., Warren, RI (US)

(72) Inventor: Karsten Schibsbye, Fredericia (DK)

(73) Assignee: TPI Composites, Inc., Warren, RI (US)

( * ) Notice: Subject to any disclaimer, the term of this patent is extended or adjusted under 35 U.S.C. 154(b) by 0 days.

(21) Appl. No.: 17/186,541

(22) Filed: Feb. 26, 2021

(65) Prior Publication Data

US 2021/0268753 A1     Sep. 2, 2021

Related U.S. Application Data

(60) Provisional application No. 62/982,928, filed on Feb. 28, 2020.

(51) Int. Cl.
| | |
|---|---|
| *B29C 70/44* | (2006.01) |
| *B29C 70/54* | (2006.01) |
| *B29L 31/08* | (2006.01) |

(52) U.S. Cl.
CPC .......... *B29C 70/443* (2013.01); *B29C 70/446* (2013.01); *B29C 70/544* (2021.05); *B29L 2031/085* (2013.01)

(58) Field of Classification Search
CPC ... B29C 70/443; B29C 70/446; B29C 70/544; B29L 2031/085
See application file for complete search history.

(56) References Cited

U.S. PATENT DOCUMENTS

| | | | |
|---|---|---|---|
| 5,316,462 | A | 5/1994 | Seemann |
| 7,959,753 | B2 * | 6/2011 | Nunez Delgado ........... B29D 99/0014 156/245 |
| 9,168,705 | B2 * | 10/2015 | Bendel ............ B29C 70/86 |
| 2003/0102604 | A1 | 6/2003 | Mack et al. |
| 2011/0116935 | A1 | 5/2011 | Wansink |
| 2014/0217651 | A1 | 8/2014 | Grove-Nielsen |
| 2019/0152126 | A1 | 5/2019 | Tobin et al. |
| 2020/0171764 | A1 * | 6/2020 | Schibsbye ........ B29D 99/0028 |

OTHER PUBLICATIONS

International Search Report and Written Opinion for International Application No. PCT/US2021/019789 dated May 6, 2021.

* cited by examiner

*Primary Examiner* — Ryan J. Walters
(74) *Attorney, Agent, or Firm* — Stephen J. Kenny; Foley Hoag LLP

(57) ABSTRACT

Devices, systems, and methods of improving manufacture of a composite wind turbine blade are provided to reduce cure time, and minimize consumable waste. After layup of a plurality of fiber panels along a blade mold, a pre-kitted vacuum bag can unrolled and overlaid on top of the fabric panels. The vacuum bag includes a plurality of fluid channels within the bag which have a pre-formed spring element embedded therein to allow for distribution a flowable resin to permeate the fiber panels and form a fiber-reinforced structural component, e.g. wind turbine blade.

15 Claims, 9 Drawing Sheets

PRE-KITTED INFUSION PACKAGE INCLUDING VACUUM BAG WITH BUILT-IN INFUSION CHANNELS AND CONSUMABLES

CROSS-REFERENCE TO RELATED APPLICATIONS

This application claims the benefit of priority under 35 U.S.C. § 119(e) of U.S. Provisional Application No. 62/982,928 filed Feb. 28, 2020, the entire contents of which are hereby incorporated by reference.

FIELD OF THE DISCLOSED SUBJECT MATTER

Embodiments of the present disclosure relate to devices, systems, and methods of improving manufacturing reliability and efficiency during composite part, e.g. wind turbine blade, manufacture. In particular, the devices, systems, and methods of the present disclosure relate to a vacuum bag having distribution channels for infusion during manufacturing of a composite surface.

BRIEF SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes an apparatus for forming a composite wind turbine blade comprising: a plurality of fiber panels disposed in a first turbine blade half; a plurality of fiber panels disposed in a second shell; a first vacuum bag disposed above the first turbine blade half; the first vacuum bag includes a first series of fluid channels, at least a portion of the fluid channels having a spring element disposed therein; and a second vacuum bag disposed above the second turbine blade half; the second vacuum bag includes a second series of fluid channels, at least a portion of the fluid channels having a spring element disposed therein; the first spring elements disposed within the channels and fixedly attached to the first vacuum bag, and the second spring elements disposed within channels and fixedly attached to the second vacuum bag.

In some embodiments, at least one fluid channel extends along the entire span of the blade.

In some embodiments, at least one fluid channel extends from a leading edge to a trailing edge of the blade.

In some embodiments, the fluid channels of at least one of the first and second bag are distributed in a uniform pattern about a surface of the blade.

In some embodiments, a first region of the blade has a first number of fluid channels and a second region of the blade has a second number of fluid channels.

In some embodiments, the first region is the root region of the blade and the second region is the tip region of the blade.

In some embodiments, the fluid channels are configured with a uniform cross section.

In some embodiments, an inlet fluid channel of at least one bag is configured with a greater diameter than a fluidly coupled distribution channel.

In some embodiments, the fluid channels are configured for unidirectional flow.

In some embodiments, the fluid channels include at least one closure mechanism to maintain the spring element within the channel.

In some embodiments, the fluid channels include two closure mechanisms, the spring element disposed between the closure mechanisms.

In some embodiments, at least one fluid channel circumscribes the spring element.

In some embodiments, at least one fluid channel is an enclosed conduit having an inner diameter, the spring element contacting an inner surface of the fluid channel at diametrically opposed locations.

In some embodiments, at least one spring element includes a pair of parallel rods.

In some embodiments, the spring element includes undulating arcs extending from the parallel rods.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE SEVERAL VIEWS OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION

Figure 1:
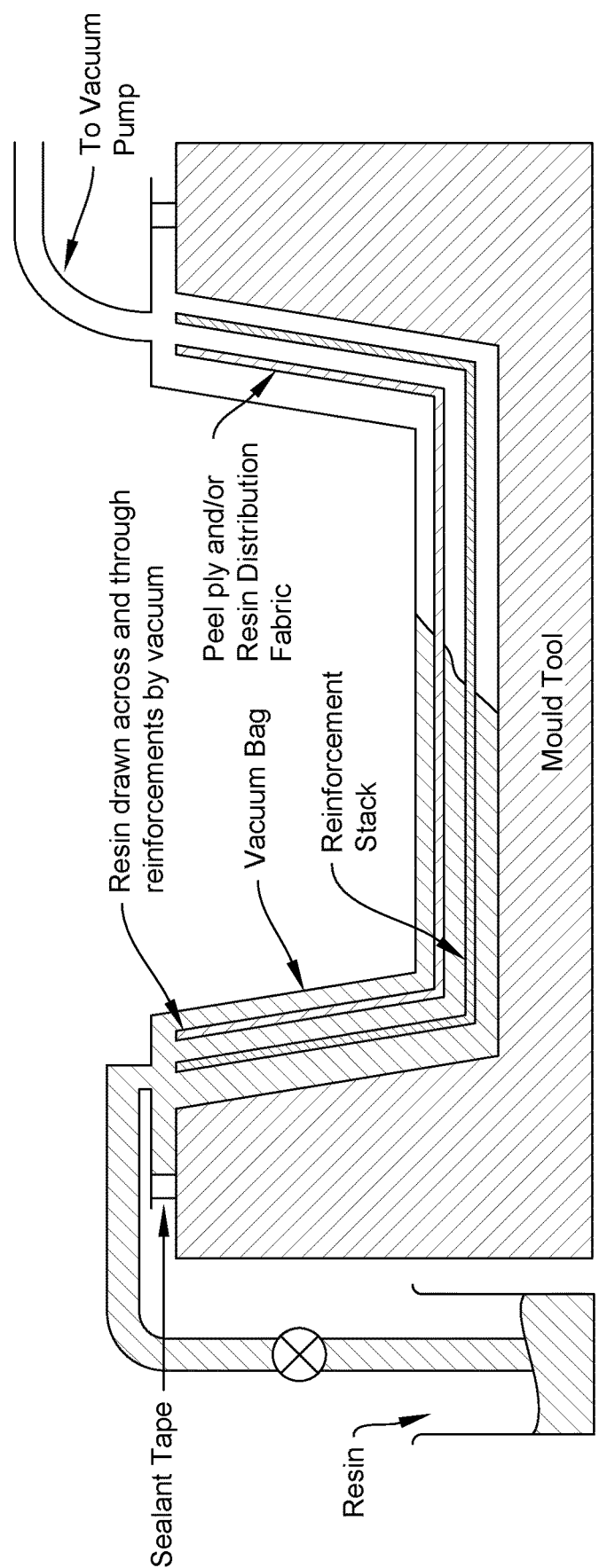
FIG. 1 illustrates an exemplary modular molding system for wind turbine blade manufacture including modular vacuum assisted resin transfer molding, according to embodiments of the present disclosure.

Reference will now be made in detail to exemplary embodiments of the disclosed subject matter, an example of which is illustrated in the accompanying drawings. The method and corresponding steps of the disclosed subject matter will be described in conjunction with the detailed description of the system.

Modern wind turbine rotor blades are built from fiber-reinforced plastics as fiber-reinforced plastics have high strength-to-weight ratios. A rotor blade typically includes an airfoil shape having a rounded leading edge and a sharp trailing edge and the blade includes a blade root that connects to a hub of the turbine. Multiple rotor blades are connected at the respective blade root to the hub to create the wind turbine. The blade root includes a plurality of root bushings set within the fiber-reinforced polymer that provides reinforcement to the blade. Bolts are engaged with threads in the root bushings to connect the blade root to the hub.

A typical turbine blade is made by molding two half-shells in a pair of molds. A spar cap (analogous to the spar in an aircraft wing), web stiffeners (ribs) and other details may be optionally installed into one of the blade halves. Adhesive is applied to the bonding perimeter/edges of the first shell, for example, in equally-spaced beads. The second half shell is then turned over, still in its mold tool, and lowered onto the first. The molds are pressed together and the adhesive is allowed to cure, joining the two halves of the blade together. This process by which the two blade halves are joined together with paste is called blade closure.

In various embodiments, the mold may be made out of any suitable metal as is known in the art. In various embodiments, the mold may include a metal, such as, for example, aluminum, steel, stainless steel, titanium, tantalum, tungsten, or any suitable combination of metals (e.g., a metal alloy). In various embodiments, the mold may include a polymer, for example, polyethylene, polyurethane, polyethylene terephthalate, polyvinyl chloride, etc. In various embodiments, the mold may be made by machining (e.g., CNC machining), 3D printing (e.g., using Direct Metal Laser Sintering (DMLS) and Fused Deposition Modeling (FDM)), open molding, closed molding, resin infusion, compression molding, composite hand layup, injection molding, pultrusion, automated fiber placement, tube rolling, automated tape laying, filament winding, resin transfer molding, or any suitable manufacturing technique as is known in the art. One skilled in the art will recognize that any suitable 3D printing technique may be used to manufacture the components described herein.

The blade shells (i.e. high pressure side and low pressure side, or "inner" and "outer") of the blade are made of a fiber-reinforced polymer, such as fiberglass-reinforced epoxy resin. Other suitable fiber reinforcements may be incorporated together with other fibers or independently, such as, for example, carbon fiber (unidirectional and/or bidirectional), Kevlar, fiberglass (unidirectional and/or bidirectional), etc. Moreover, the blade shells may include any suitable number of layers of fiber reinforcement for the desired thickness and properties of the part. The core is made of any suitable material, such as, for example, a polymer foam (e.g., polyurethane, divinylcell, polyisocyanurate, etc.), a sandwich core (e.g., nomex honeycomb, aluminum honeycomb, balsa, etc.), and/or a polymer honeycomb material.

Infusing the polymer (e.g. epoxy based resin systems) into the porous dry reinforcement material is the most critical process in fabrication of wind turbine blades. In this process, vacuum pressure is generated inside the reinforcement material is achieved by attaching a sealed bag around the perimeter of the blade mold (e.g. each mold half including a bag sealed about the leading and trailing edges, and from root to tip). This vacuum bag allows for a pressure differential to be created which draws or sucks the resin system into the reinforcement material before the polymer is cured to maintain the designed mechanical strength of the composite part.

Figure 8:
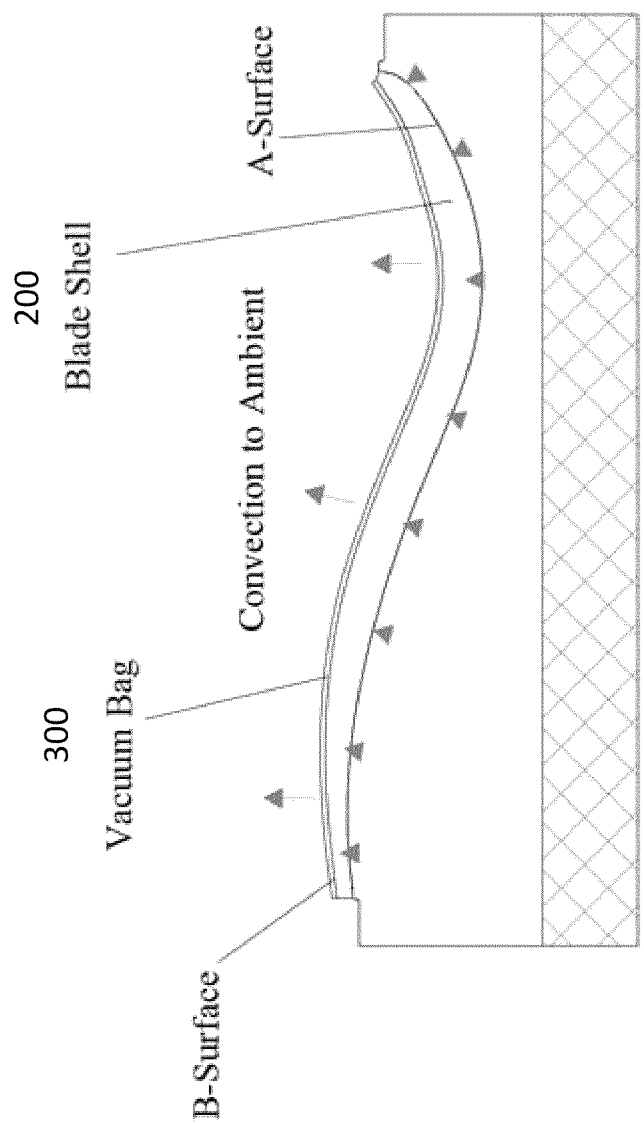
FIG. 8 is a cross sectional view of a vacuum bag applied to a mold for forming a composite wind turbine blade, in accordance with the present disclosure.

FIG. 1 illustrates an exemplary technique for forming the composite blade, i.e. vacuum assisted resin transfer molding (VA-RTM). In such a technique, resin is drawn into the mold via vacuum force, which requires low heat and pressures. This technique allows for large component manufacture with deep draw and high fiber volume fractions and low void (or air pocket) formations. Prior to starting the process, consumable materials including flow mesh and other membranes, as well as under-bag resin flow lines, are precisely placed on the B-surface of the shells (as shown in FIG. 8). These flow lines (called omega channels) are separate components that guide the resin flow under the bag while allowing for gradual infusion of the polymer into the porous media. The insertion of these omega channels is a time consuming manual process which often results in errors or imperfect distribution of resin.

Moreover, these separate components add to the cost and waste of the manufacturing process as these separate components are not reusable. Following this step, the shell is covered by vacuum bag and the part perimeter is sealed on the tooling flange using tacky tapes. To begin with, resin is stored in multiple reservoirs (called drums) in various locations along the part. Once the desired level of vacuum is maintained under the bag, resin is sucked into the part through outer resin feedlines. The process ends when the dry fabrics are fully infused by the polymer which is usually confirmed visually. In accordance with an aspect of the present disclosure, confirmation of the completion of the infusion process can be provided by mechanical deformation (e.g. compression) of the spring element(s) (400), described in further detail below.

Figure 2:
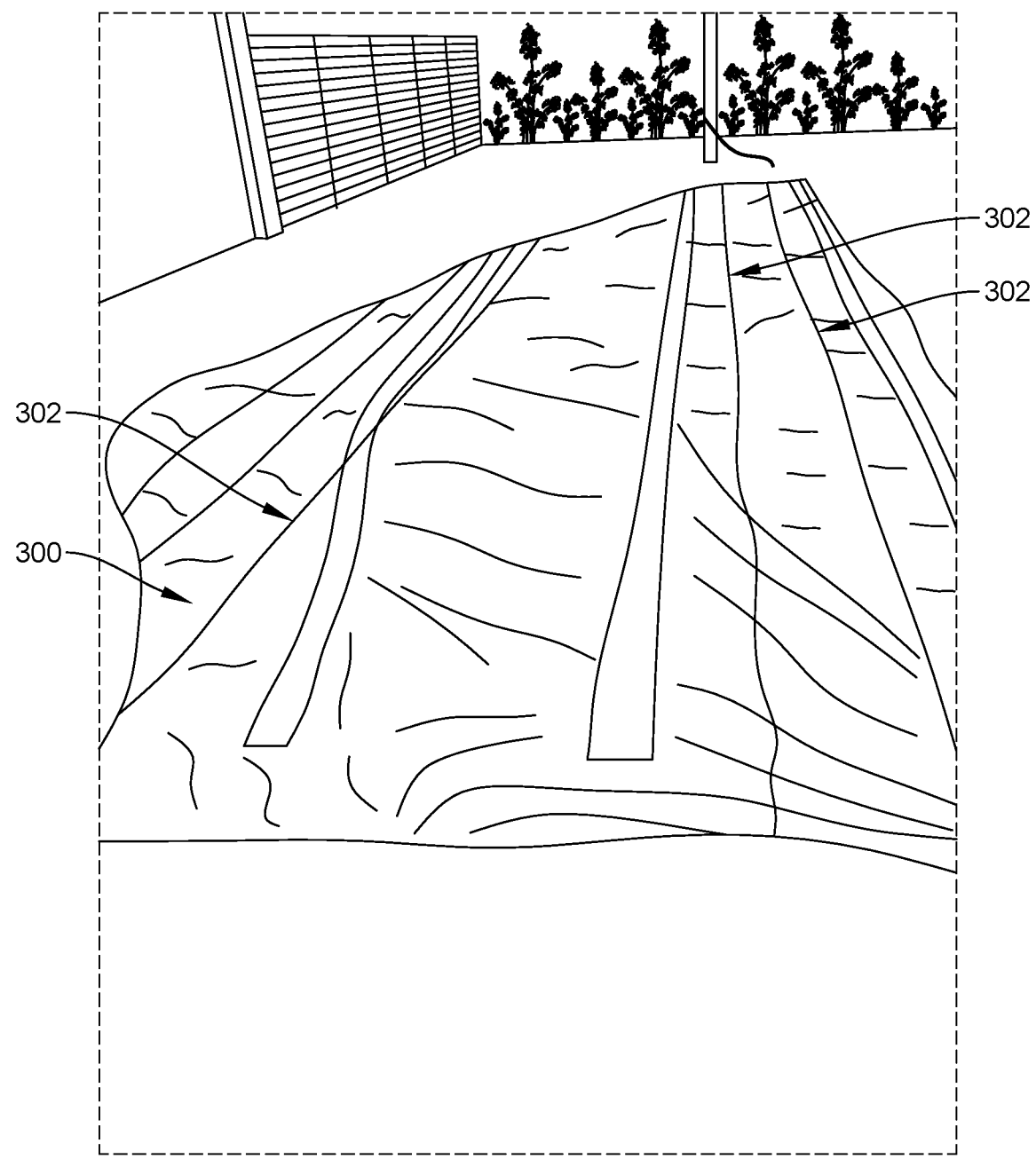
FIG. 2 illustrates an exemplary vacuum bag for fabricating composite structures in accordance with the disclosed subject matter.

In accordance with an aspect of the present disclosure, a pre-kitted infusion package is provided which includes consumables and a vacuum bag to reduce the molding production cycle time, as shown in FIG. 2. As disclosed herein, consumable layers are attached (e.g. stitched) to the vacuum bag, and the separate omega tubes described above are replaced by built-in resin flow channels 302. The number, and pattern, of channels can be customized to accommodate the composite component to be manufactured, and made to order.

Figure 3:
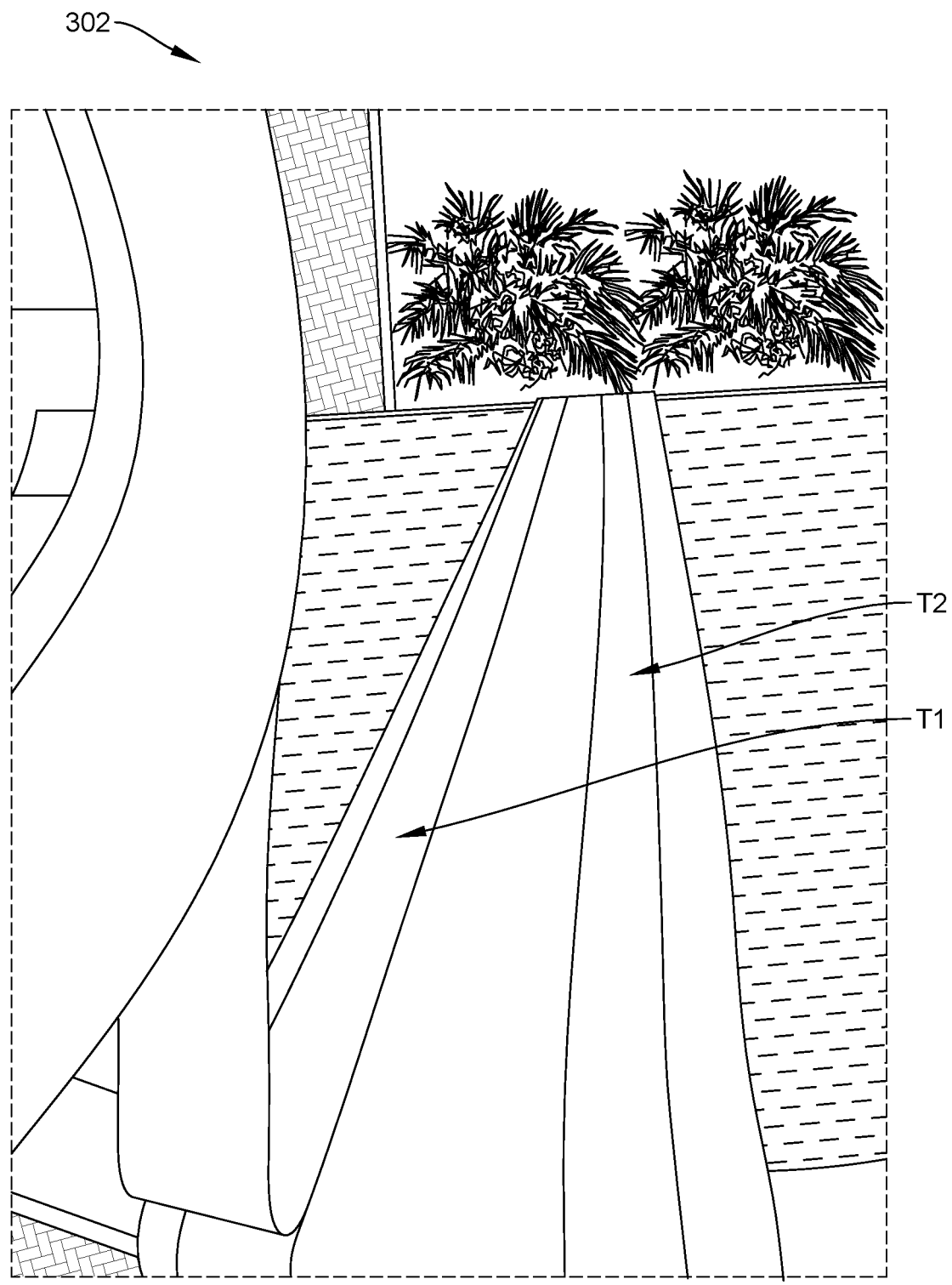
FIGS. 3-5 illustrates an exemplary infusion channel according to embodiments of the present disclosure.
Figure 4:
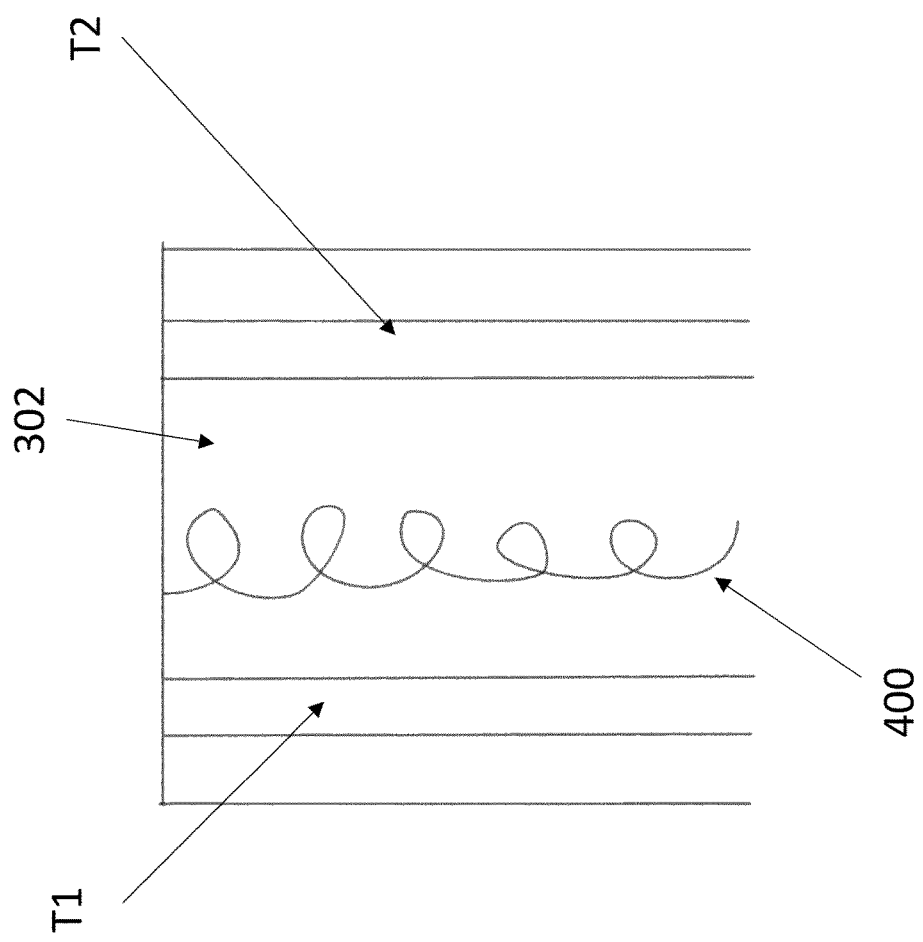
Figure 5:
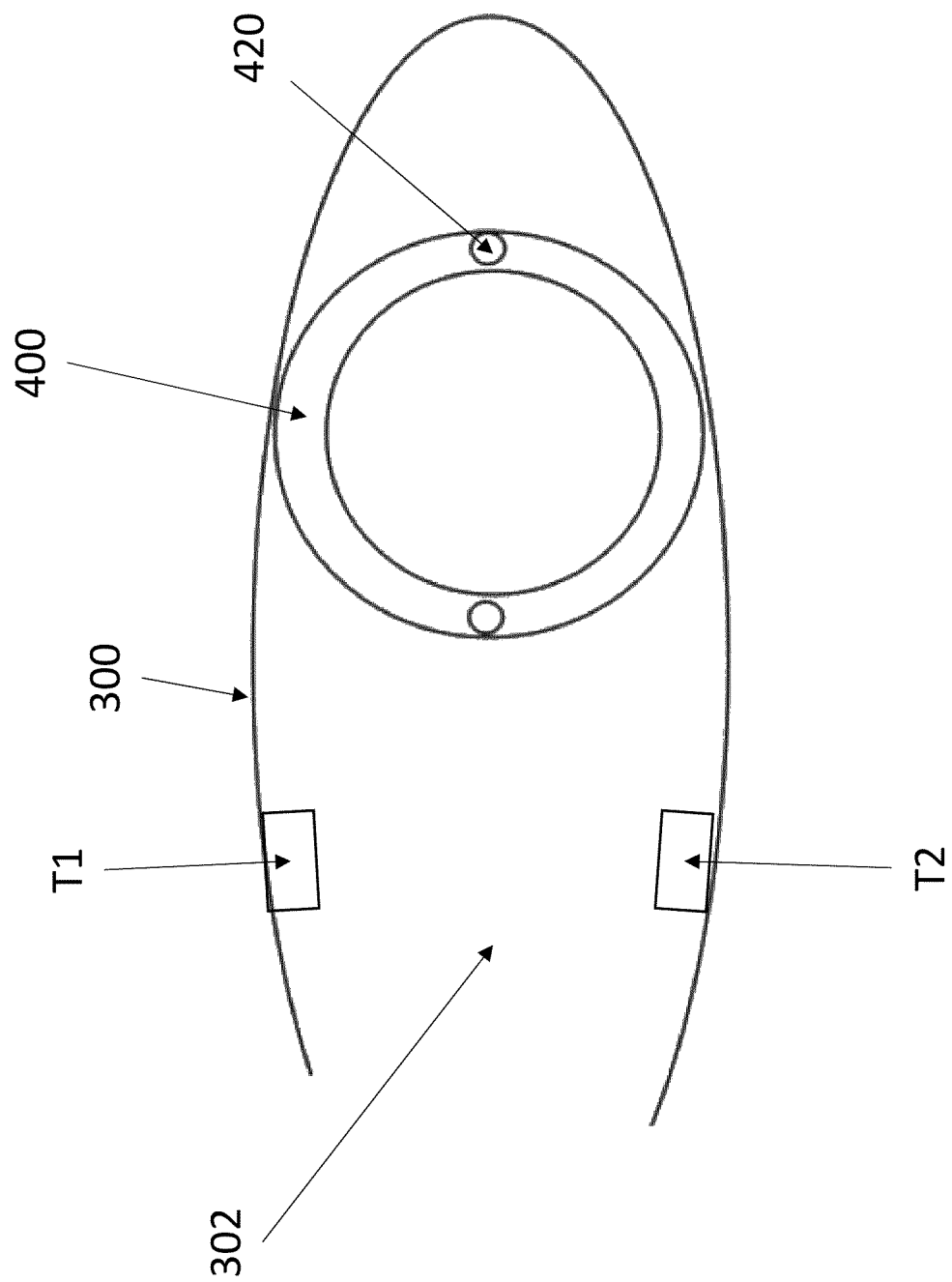

As shown in the exemplary embodiment of FIGS. 3-5, the conduits or channels 302 are formed by taking a plastic roll (e.g. about 10~15 cm wide) of an elastomer, rolling it through a packaging unit and attaching a closure mechanism (e.g., double-sided tape) T1, T2 on each side to create a space in the middle (e.g. about 5 cm wide and 1~2 mm deep). The channel 302 can be formed by folding the bag material such that the two closure mechanisms T1, T2 are positioned on top of each other, thereby forming a conduit or channel from the space between tape strips. In some embodiments these closure mechanisms form a mechanical bond (e.g. tongue/groove coupling). Additionally or alternatively, the closure mechanisms can form an adhesive union; and in some embodiments, a magnetic union can be included.

Additionally, a "spring" element 400 is placed within in the channel cavity, to maintain the patency of the channel 302, in order for liquid resin to flow through the channel during the VARTM process. The closure mechanisms T1, T2 can reduce or pinch the channel 302 so as to maintain the spring element 400 permanently housed within the channel 302, with the channel completely surrounding or circumscribing the spring elements.

Figure 6:
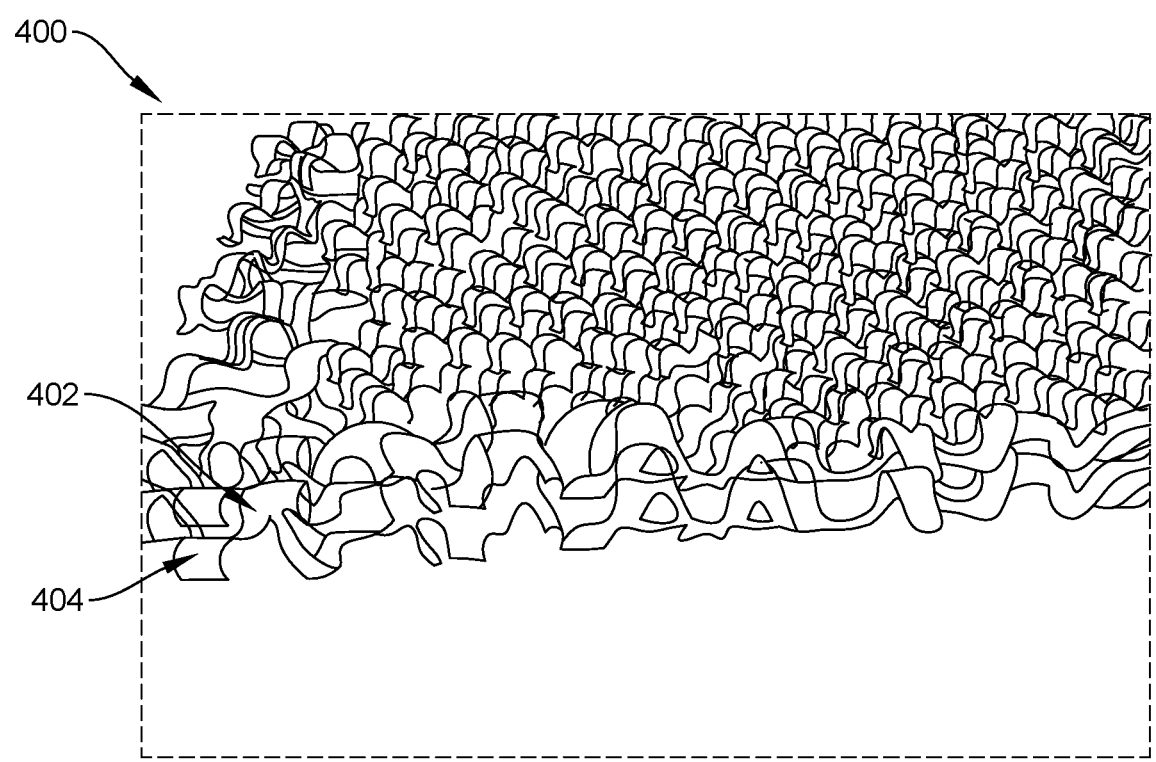
FIGS. 6, 7A-G illustrate exemplary springs for maintaining the patency of the infusion channel according to embodiments of the present disclosure.

An exemplary embodiment of a spring element 400 is shown in FIG. 6, which can be formed of a variety of resiliently deformable materials such as plastic (to allow the bag 300 to contour to the shape of the mold/part to be formed) yet rigid enough to maintain the spacing/diameter of the channel to permit resin to flow throughout during the infusion process. Once the vacuum pressure is applied and the bag 300 is drawn down on the "B-surface" (i.e. surface of the part opposite the mold), the spring element 400 in the cavity maintains the passage permeability enabling the resin flow throughout the entire channel.

The spring element 400 can be a single piece of integrally connected series of barbs, or be separate discrete components with each one individually positioned within the channel. In some embodiments, select, or all, spring element(s) can be releasably coupled to each other (e.g. resembling a chain link interlocking design). In some embodiments, the spring element can be formed as a series of discrete rods or links of arcuate segments 402, 404 (described further below), which each adjacent rod/link being capable of independent relative movement (e.g. one can deform downwardly, the other deforms upwardly within channel 302). Thus, the spring element contacts an inner surface of the fluid channel at diametrically opposed locations. In some embodiments, the spring element 400 can be formed as a unitary sheet of material, having a first set of arcuate segments 402 extending upwardly in a convex manner, and a second set of arcuate segments 404 extending downwardly in a concave manner. In accordance with an aspect of the disclosure, the spring element(s) 400 can be incorporated into the bag, and permanently retained within the channel 302 of the bag such that the bag and spring elements can be attached and removed from the mold as a unitary structure in a single step.

Each spring rod or bard can have a generally cylindrical shape having a first arcuate segment 402 protruding downward from a longitudinal central axis, and a second arcuate segment 404 protruding upward from the longitudinal central axis, as shown in FIG. 6. The arcuate elements 402, 402 can be formed of elastic shape-memory material to permit local deformation, and subsequent return to the undeformed configuration.

Figure 7A:
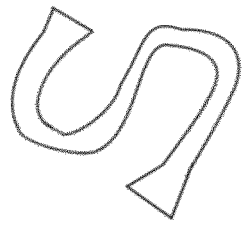
Figure 7B:
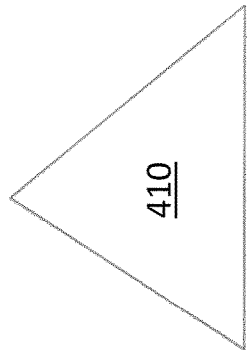
Figure 7E:
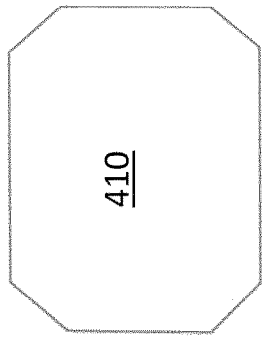
Figure 7C:
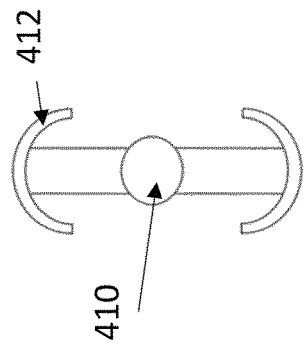
Figure 7D:
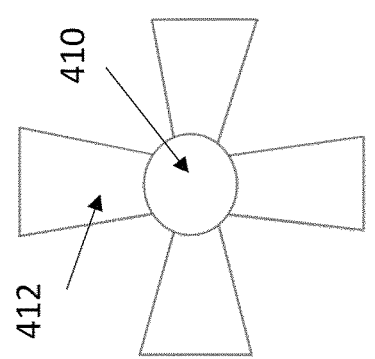
Figure 7G:
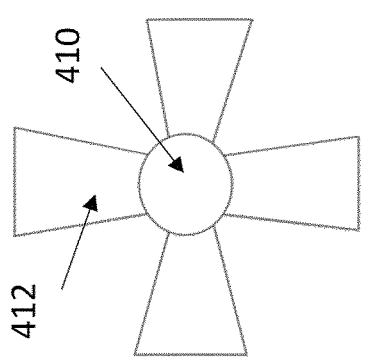
Figure 7F:
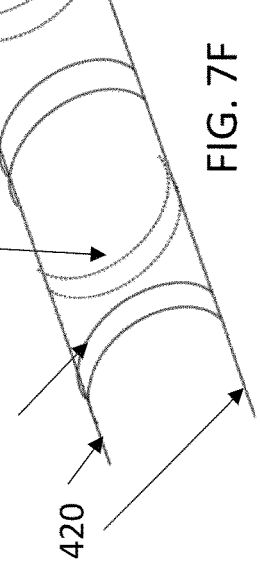

Some additional examples of spring elements are shown in FIGS. 7A-F. FIG. 7A depicts the spring element as an omega-shaped insert. FIG. 7B depicts an S-shaped spring element where the ends can have a greater thickness than the center to increase the surface area in contact with the interior walls of the channel and thus providing greater resistance to compression. In some embodiments, the spring element can include a hollow portion 410, as shown in FIGS. 7C-E and 7G. A plurality of spokes 412 can extend radially outward from the hollow center portions 410. The spokes can extend from all four sides, or alternatively only two sides and be formed as a scaffold (or similarly hollow) so as to minimize any obstruction or occlusion of resin flow through/around the spring elements. In the embodiment shown in FIG. 7F, the spring is formed from a pair of parallel rods 420 that extend along the length of the channel 302. The rods 420 include arcs that alternate in an undulating fashion such that a first arc 422 projects upwardly, and adjacent arc 424 projects downwardly, the combination of arcs effectively form a tunnel that maintains the channel in an open configuration. The embodiment shown in FIG. 6 includes a series of rods 420 connected to each other (or formed integrally) with undulating arcs as described herein. Also, the edges of the spring element(s) can be rounded or chamfered to minimize risk of damage to the internal channels 302.

In some embodiments, the closure mechanism T1, T2 can be integrally formed within the elastomer vacuum bag package 300 and be inserted in the mold as part of the kit. In some embodiments, the closure mechanism T1, T2 is pre-installed to the bag, as shown in FIG. 3, so a user simply need to roll out the bag to the desired length (determined by blade design) and insert or attach the desired spring element(s) 400 between the tape T1, T2. The spacing between closure mechanism T1, T2 define the diameter of the channel 302 formed therein once the two closure mechanisms are rotated/pivoted to be brought into engagement with each other.

In forming the composite structure, e.g. wind turbine blade, polymers (which are epoxy based resin systems) are inserted into the mold in a series of panels or "layups". After reaching the designed degree of cure, these polymer layup segments serve as the matrix component in a composite structure to enable the uniform load sharing between reinforcement fibers thereby creating the ultimate mechanical strength in the part.

A network of fluid channels 302 are incorporated into the vacuum bag 300 which overlays the composite part 200 being manufactured, with the vacuum bag serving as a barrier by which to create a vacuum force to pull the resin throughout the layup fibers, as shown in FIG. 8. These fluid channels 302 serve as corridors for liquid resin to travel throughout and infuse the reinforcing fabric thereby forming the composite part 200. In some embodiments, access points (e.g. removable patches) are included in the bag along the channels 302 that permit an operator to access the interior channel, e.g. to remove debris.

The fluid channels 302 can extend along the entire span of the blade and from leading edge to trailing edge. In some embodiments the fluid channels 302 are distributed in a uniform pattern across the surface area of the blade. In some embodiments, the fluid channels 302 can be patterned with regions of the blade (e.g. root) having a more dense distribution of channels 302 than other regions (e.g. tip). The fluid channels 302 can have a constant cross section (e.g. uniform diameter) along the entire channel length.

Additionally or alternatively, select fluid channels, or just portions thereof, can serve as supply channels (e.g. at locations near the blade perimeter) which have a greater volume (e.g. diameter) than distribution channels (e.g. which span across the blade in a chord-wise direction). The smaller distribution channels can be fluidly coupled to the main supply channels (e.g. branch outwardly), and serve to direct flowing resin across particular regions of the blade. In some embodiments the channels can be configured for unidirectional flow.

The fluid channels can have a pattern reflecting the underlying components (e.g. spar caps) being formed which direct the resin along varying chord-wise distances to provide sufficient dwell time to achieve the desired amount of resin at each location. For example, the channels can be configured with a staggered channel pattern or straight channel pattern, linear or non-linear. Furthermore, any number of channels can be provided—with each channel having a common resin supply inlet to permit fluid flow across the mold surfaces.

Accordingly, the pre-kitted infusion system disclosed herein not only accelerates the production process but also improves the quality of the composite part by better distributing the resin across the area of the part (e.g. blade) and reducing or eliminating any blockages of the resin thereby providing a more homogenous structure. Furthermore, the present disclosure reduces cost and complexity by reducing the amount of consumables used during manufacturing, e.g., eliminates the need for separate omega channels to be inserted, and subsequently removed and discarded from the mold after the blade is formed.

Figure 9:
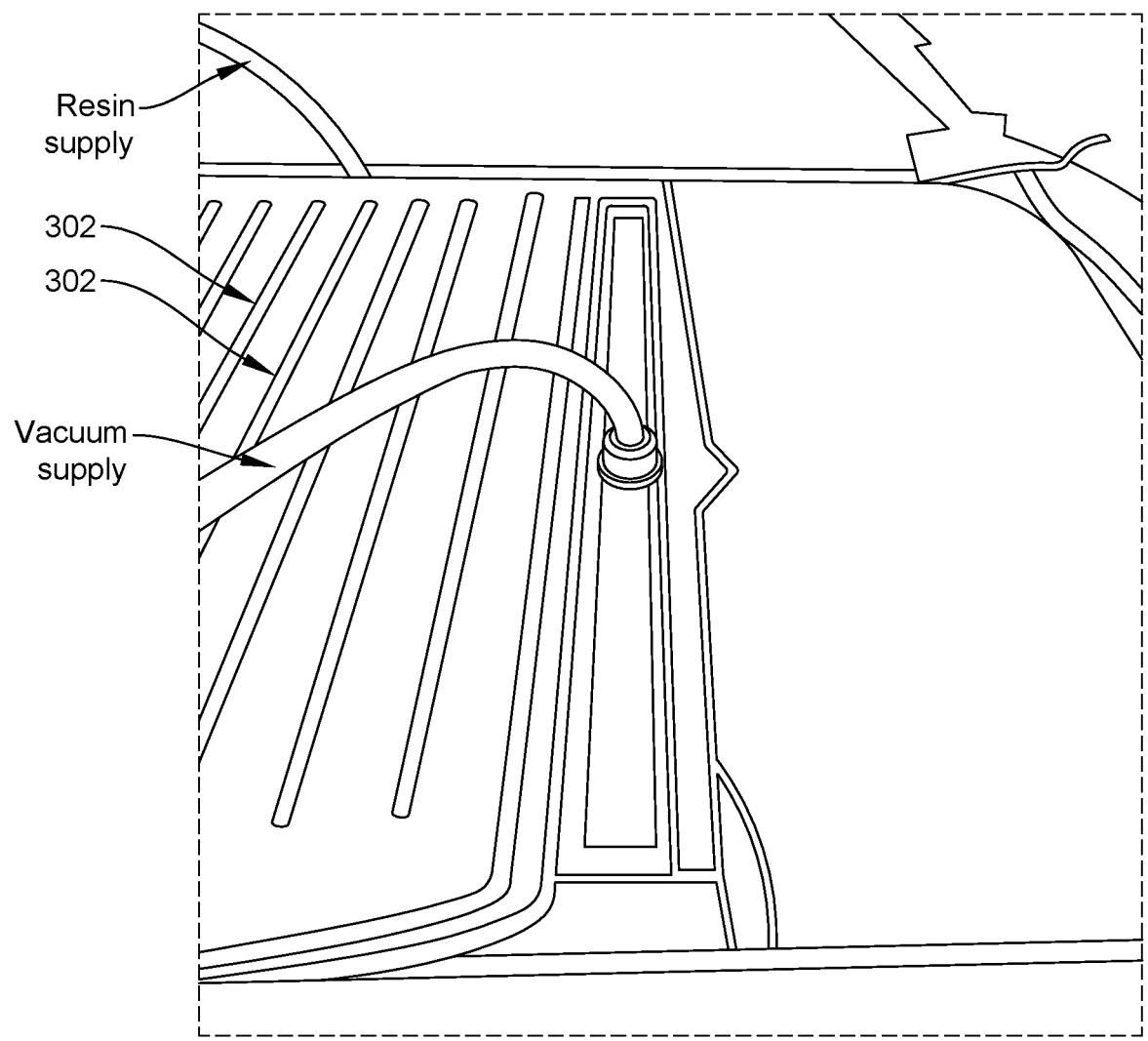
FIG. 9 illustrates an exemplary vacuum bag having the pre-formed infusion channels therein in use with a vacuum pressure source, according to embodiments of the present disclosure.

In some embodiments, the system/kit disclosed herein can include a breather (or bleeder) cloth which allows air from all parts of the envelope (i.e. cavity between vacuum bag and mold) to be drawn to a port or manifold by providing a slight air space between the bag and the laminate. Additionally, a release fabric and/or perforated film can be included and configured as a smooth woven fabric that will not bond to epoxy and serve to separate the breather and the laminate. Accordingly, excess epoxy can wick through the release fabric and be peeled off the laminate after the laminate cures. Furthermore, the vacuum bag with pre-formed channels disclosed herein can also include channels dedicated for fluid communication with the vacuum line, as shown in FIG. 9. The vacuum channels can have a different (e.g. larger) diameter than the resin channels 302. Also, it can be advantageous to form the vacuum bag from a translucent material, such that the dispensing of the resin within the channels can be visually observed to confirm that no voids (air pockets) are formed in the composite part.

In some embodiments, the resin is distributed from the center of the article (e.g. wind turbine blade location coinciding with greatest camber) to the periphery (e.g. flange defining leading/trailing edges), and the vacuum can be drawn from the periphery. This arrangement purges any air leaks from the seals at the periphery of the vacuum bag preventing air bubbles or voids in the resin impregnated fiber.

The bag disclosed herein can be formed from a variety of materials (e.g, polyethylene, rubber, silicone, etc.) that remains sufficiently flexible that it can be rapidly applied over the fiber lay up of an article by means of adhesive tape (e.g. tacky tape), and has the further advantage that it provides for a ready and even distribution of resin even under a one time use. The bag material is not adhesive to resin, and can easily be pealed from the resin. If desired, a suitable separation layer can be applied to the interface of the bag material before being laid up against the article to be impregnated. Thus, the bag material can be selected so that it is suitable for one time as well as repeated use and provides the integral uniform resin channels without requiring a separate distribution layer between the outer vacuum bag and the article being laid up.

The present disclosure is applicable to a variety of blade designs, including ones with shear web(s) and corresponding spar caps. The upper and lower mold skins can also include a core material, e.g. having an increasing thickness from the midpoint to trailing edge of the blade.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

What is claimed is:

1. An apparatus for forming a composite wind turbine blade comprising:
   a plurality of fiber panels disposed in a first turbine blade half;
   a plurality of fiber panels disposed in a second turbine blade half;
   a first vacuum bag disposed above the first turbine blade half; the first vacuum bag includes a first series of fluid channels, at least a portion of the fluid channels having a first spring element disposed therein; and
   a second vacuum bag disposed above the second turbine blade half; the second vacuum bag includes a second series of fluid channels, at least a portion of the fluid channels having a second spring element disposed therein;
   the first spring elements disposed within the channels and fixedly attached to the first vacuum bag, and
   the second spring elements disposed within channels and fixedly attached to the second vacuum bag.

2. The apparatus of claim 1, wherein at least one fluid channel extends along the entire span of the blade.

3. The apparatus of claim 1, wherein at least one fluid channel extends from a leading edge to a trailing edge of the blade.

4. The apparatus of claim 1, wherein the fluid channels of at least one of the first and second bag are distributed in a uniform pattern about a surface of the blade.

5. The apparatus of claim 1, wherein a first region of the blade has a first number of fluid channels and a second region of the blade has a second number of fluid channels.

6. The apparatus of claim 5, wherein the first region is the root region of the blade and the second region is the tip region of the blade.

7. The apparatus of claim 1, wherein the fluid channels are configured with a uniform cross section.

8. The apparatus of claim 1, wherein an inlet fluid channel of the first vacuum bag is configured with a greater diameter than a fluidly coupled distribution channel.

9. The apparatus of claim 1, wherein the fluid channels are configured for unidirectional flow.

10. The apparatus of claim 1, wherein the fluid channels include at least one closure mechanism to maintain the respective spring element within the channel.

11. The apparatus of claim 10, wherein the fluid channels include two closure mechanisms, the respective spring element disposed between the closure mechanisms.

12. The apparatus of claim 1, wherein at least one fluid channel circumscribes the respective spring element.

13. The apparatus of claim 1, wherein at least one fluid channel is an enclosed conduit having an inner diameter, the respective spring element contacting an inner surface of the fluid channel at diametrically opposed locations.

14. The apparatus of claim 1, wherein at least one spring element includes a pair of parallel rods.

15. The apparatus of claim 14, wherein the at least one spring element includes undulating arcs extending from the parallel rods.

* * * * *